United States Patent [19]
Tashiro

[11] Patent Number: 5,290,577
[45] Date of Patent: Mar. 1, 1994

[54] METHOD AND APPARATUS FOR CONTINUOUSLY MANUFACTURING FILLED BUNS

[75] Inventor: Yasunori Tashiro, Utsunomiya, Japan

[73] Assignee: Rheon Automatic Machinery Co., Ltd., Utsunomiya, Japan

[21] Appl. No.: 9,500

[22] Filed: Jan. 26, 1993

[30] Foreign Application Priority Data

Feb. 6, 1992 [JP] Japan .................................. 4-056411
Mar. 30, 1992 [JP] Japan .................................. 4-105497

[51] Int. Cl.⁵ ......................... A21C 11/00; A21D 8/00
[52] U.S. Cl. ..................................... 426/297; 99/450.6; 99/450.7; 425/308; 425/373; 426/283; 426/503
[58] Field of Search .............. 426/297, 283, 284, 496, 426/503; 99/450.6, 450.7; 425/308, 316, 373

[56] References Cited

U.S. PATENT DOCUMENTS

| | | | |
|---|---|---|---|
| 4,692,109 | 9/1987 | Hayashi et al. | 426/503 |
| 4,883,678 | 11/1989 | Tashiro | 426/503 |
| 5,112,631 | 5/1992 | Nakamura | 426/297 |

*Primary Examiner*—George Yeung
*Attorney, Agent, or Firm*—Guy W. Shoup; Patrick T. Bever

[57] ABSTRACT

A method that comprises continuously depositing fillings on a sheet of bread dough and winding up the sheet with the deposited fillings from one of its sides into a bar of bread dough, with the fillings centered. This simple method serves to reduce production labor.

6 Claims, 6 Drawing Sheets

METHOD AND APPARATUS FOR CONTINUOUSLY MANUFACTURING FILLED BUNS

BACKGROUND OF THE INVENTION

1. Field of the Invention

This invention relates to manufacturing filled buns, and more especially to continuous processes of manufacturing from a continuously fed mass of dough the filled buns consisting of a dough coating and a filling, without exposing the filling.

2. Prior Art

In the prior-art methods the manufacture of high-quality filled buns, such as a bean-jam bun, required manual operations. In a conventional way of manually producing filled buns having a cover of a uniform thickness without exposing the fillings, a mass of kneaded bread dough is divided into smaller masses of dough. Each of them is then stretched into a separate sheet of bread dough shaped as a circle or hexagon. A measured portion of a filling is put on the center of this separate sheet of bread dough. The filling is enveloped by uniformly gathering the edges of the sheet, and then the dough is strongly pinched or twisted at the gathering point to prevent the dough edges from being separated due to the elasticity of the dough.

In the conventional dividing process the dough is weighed and mechanically divided by a piston cylinder. This tends to destroy the gluten network of the dough, and the quality of the dough is thus reduced. Since to recover the lost quality the dough must be later processed, extra equipment is needed. It has also been difficult to automatically carry out those prior-art processes so as to produce low-cost, popular foods, such as bean-jam buns, since it requires a production complex. Thus, no simple method existed in which buns were continuously and automatically produced.

The publication entitled *A Collection of Well-known Art*, published Feb. 20, 1980, by the Japanese Patent Office, shows, as a conventional technique, a winder having a roller for winding up a continuous sheet of bread dough from one of its sides into a bar of dough.

The winder has not been used for continuously manufacturing completely and neatly encrusted filled buns without exposing the filling. It aims at obtaining a product having a desired weight by cutting a horizontal bar of dough into pieces of equal lengths.

U.S. Pat. No. 4,692,109 discloses an apparatus for continuously cutting a filled cylindrical dough body wherein a blade shaped as a wedge penetrates, from above, the dough body being conveyed on a horizontal conveyor. To cut the dough body the blade is driven both down and laterally. This complex mechanism hinders the efficient mass production of high-quality filled products. Further, the blade is liable to be forced into the filling, and the sections of the cut dough body where it is cut tend to have rough surfaces. Furthermore, since the blade pushes the conveyor down, the dough body is deformed when it is cut so that nonuniformly-shaped products result.

Therefore, when a high-quality filled bun is automatically prepared from a continuously fed mass of dough, an apparatus and method has been required in which the gluten network of the dough is sufficiently developed and kept unharmed, the filling is completely encrusted by the dough crust, and in which the dough body is effectively and neatly cut and shaped.

SUMMARY OF THE INVENTION

One object of this invention is to provide an apparatus and method by which a continuously fed mass of dough is continuously processed to produce separate filled buns of high quality.

Another object of this invention is to provide an apparatus and method by which completely encrusted and neatly shaped and filled buns of a uniform weight are produced without exposing their fillings.

A further object of the invention is to provide a simple apparatus and method in which separate filled buns are continuously and automatically manufactured.

In line with one aspect of this invention, a method of continuously manufacturing filled buns is provided, which comprises:

continuously supplying a mass of dough on a horizontal conveyor, stretching the traveling mass of dough into a sheet of a uniform width and thickness, continuously depositing a filling on the sheet of dough while it is traveling on the conveyor, winding up the traveling sheet of dough with the filling in a widthwise direction into a bar of dough so that the filling is surrounded by a sheet of dough, causing the bar of dough to freely fall from the leading end of the conveyor, and dividing the falling bar of dough by squeezing it with a divider having flat pressing surfaces, so that the bar is divided into separate pieces with no filling exposed.

In the method of this invention a filling is continuously deposited on a sheet of bread dough traveling horizontally on a conveyor. The sheet with the deposited filling is wound up into a continuous bar of bread dough consisting of a spiral of the sheet of bread dough centering around the filling. Then the traveling bar of the bread dough is made to fall from the leading end of the conveyor and is divided during the fall. In the dividing process, slidable contacting plates having wide flat surfaces are used instead of conventional wedge-shaped blades to divide the bar-shaped bread dough. They do so by applying a pressing force to its periphery. This invention aims to provide a method to continuously produce separate pieces of filled dough products without exposing the filling at the sections where they are cut. This can be done because dough, which is resilient, differs from the plastic filling in its rheological properties. That is, because the tensile strength of the bread dough is greater than that of the filling, which is almost zero, this enables the filled bar to be separated with no filling being exposed when a pressing force is applied in both the vertical and tangential directions to the periphery of the bar.

DESCRIPTION OF THE PREFERRED EMBODIMENTS

The structure of the apparatus of this invention will now be explained by reference to the drawings.

Figure 1:
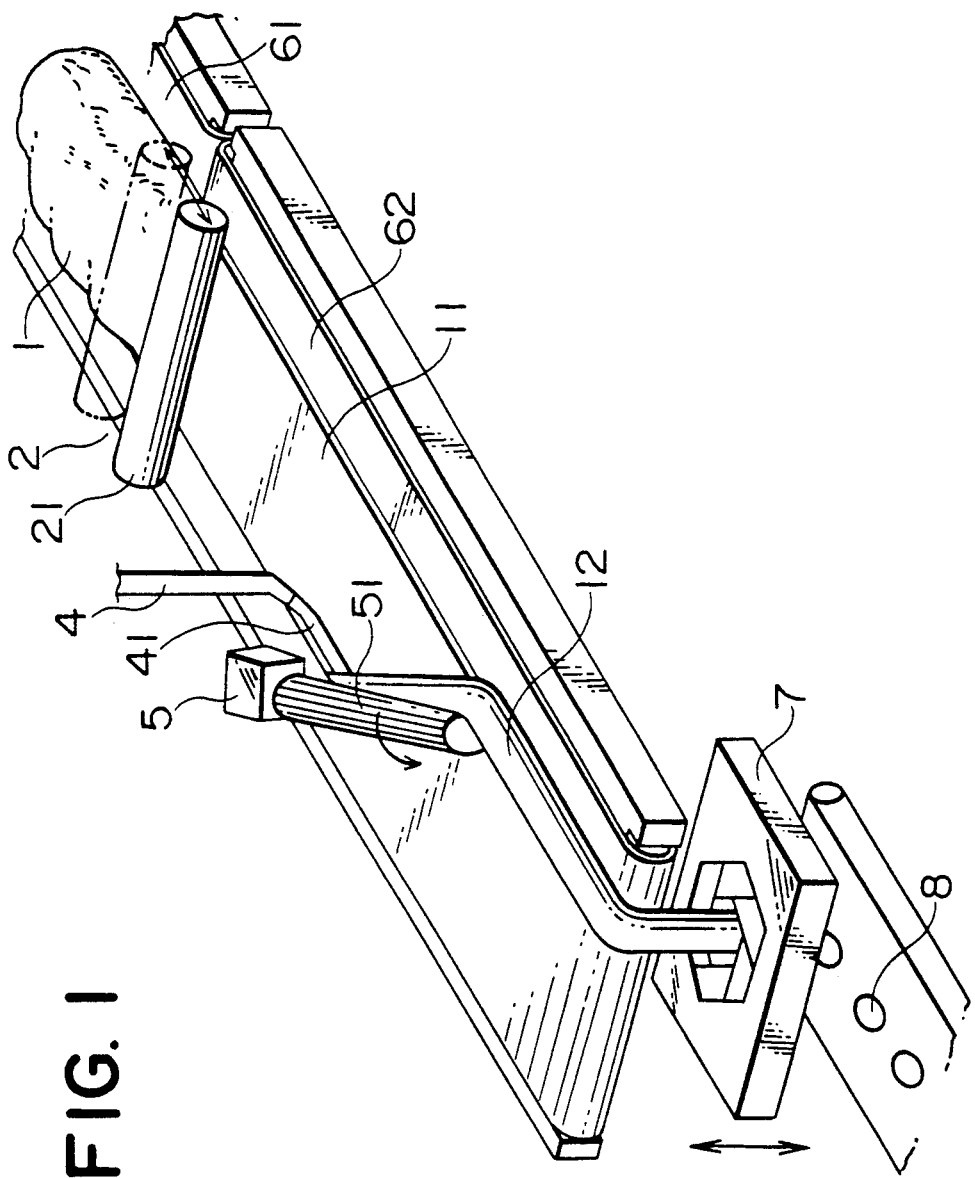
FIG. 1 is an overall schematic perspective view of one of the embodiments of this invention.

In FIG. 1, showing the overall and perspective constitution of the apparatus of this invention, a mass of bread dough 1, kneaded and prepared in any conventional way, is transferred from a feeding conveyor 61 to a transfer conveyor 62, which runs faster than the feeding conveyor 61. These conveyors can be belt conveyors.

A stretcher 2 that stretches the mass of dough 1 into a sheet of bread dough 11 is disposed above the conveyors 61,62 with a preset distance between the stretcher and the upper surfaces of the conveyors. The stretcher consists of a roller 21 reciprocating in the traveling and the reverse directions.

Any of those stretchers disclosed in U.S. Pat. Nos. 5,041,917, 5,164,201, and 5,151,024, which were granted to the same applicant as that of this application, can be used to stretch the mass of bread dough 1.

Means 4 for depositing a filling on the sheet of bread dough is disposed downstream of the stretcher 2. It continuously deposits a uniform amount of filling 41, such as bean jam.

Any publicly known apparatus, such as a dosing feeder, can be used as the depositing means 41 to continuously deposit a uniform quantity of the filling.

Means 5 for winding up the sheet of bread dough 11 with the deposited filling 41, known as a "side winder," is located downstream of the depositing means 4. It has a toothed roller 51 rotating in the direction shown by an arrow to roll up the sheet of dough 11 into a bar of bread dough 12. The winder 5 is disposed in a direction aslant the widthwise direction of the sheet of bread dough 11. It is pivoted at one of its ends so that the angle between the winding roller 51 and the sheet of bread dough can be adjusted both to locate the wound bar of bread dough at a preset course on the conveyor and to select a position where the wound bar of bread dough starts traveling in the traveling direction of the conveyor belt. The wound bar of bread dough is guided by a guide roller (not shown) disposed above the conveyor 62 by being passed through and between the guide roller and the conveyor 62.

Any publicly known side winder, such as those that are listed in the above-mentioned publication, published by the Patent Office, can be used as the winder 5.

A divider 7 is located at the downstream end of the transfer conveyor 62. The wound bar of dough smoothly and freely falls from the downstream end of the conveyor belt and is divided just after the bar of bread dough passes around the downstream end of the conveyor, where the conveyor belt moves about a roller supporting the belt.

Figure 2:
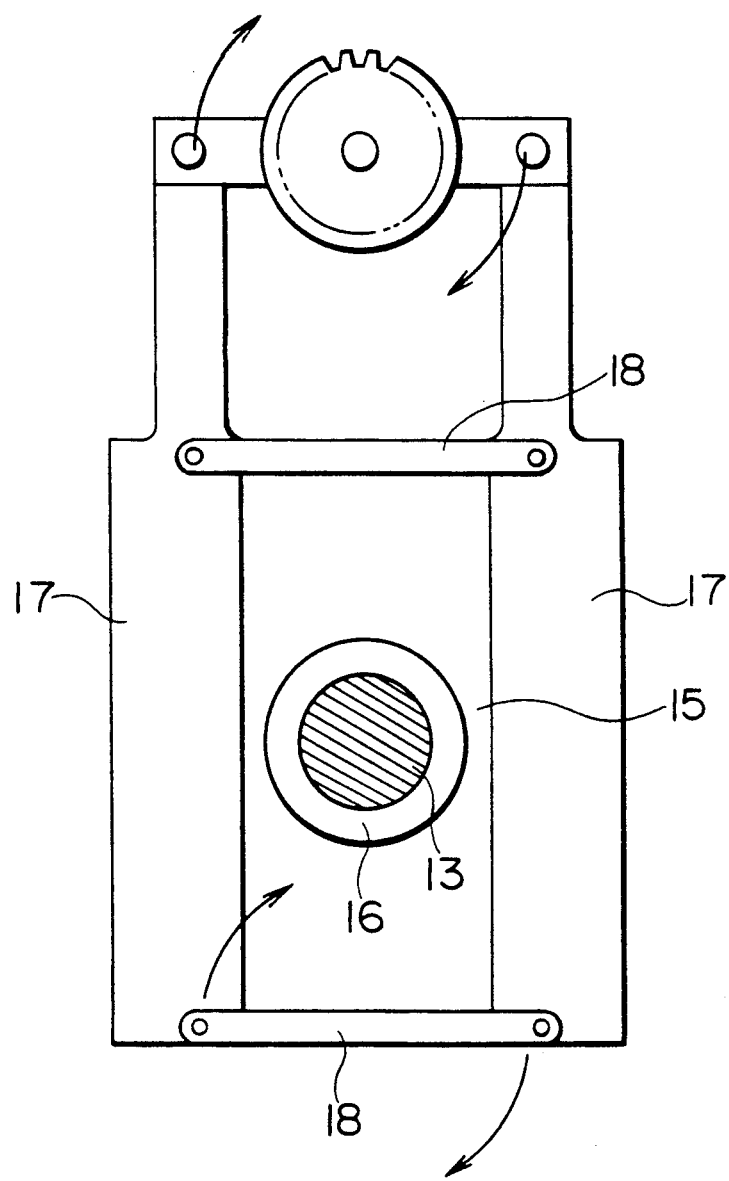
FIG. 2 is a plan view of the embodiment of the divider having pressing plates.

One of the embodiments of the divider of this invention will now be explained. FIG. 2 shows pressing plates 17 for dividing a bar-shaped material 15 by applying a pressing force from two directions to the periphery of the bar-shaped material.

The pressing plates 17 face each other, and are spaced apart from each other to leave a sufficient space for the bar-shaped material 15 to pass between them. The plates 17 are joined by pivoting links 18.

Figure 3:
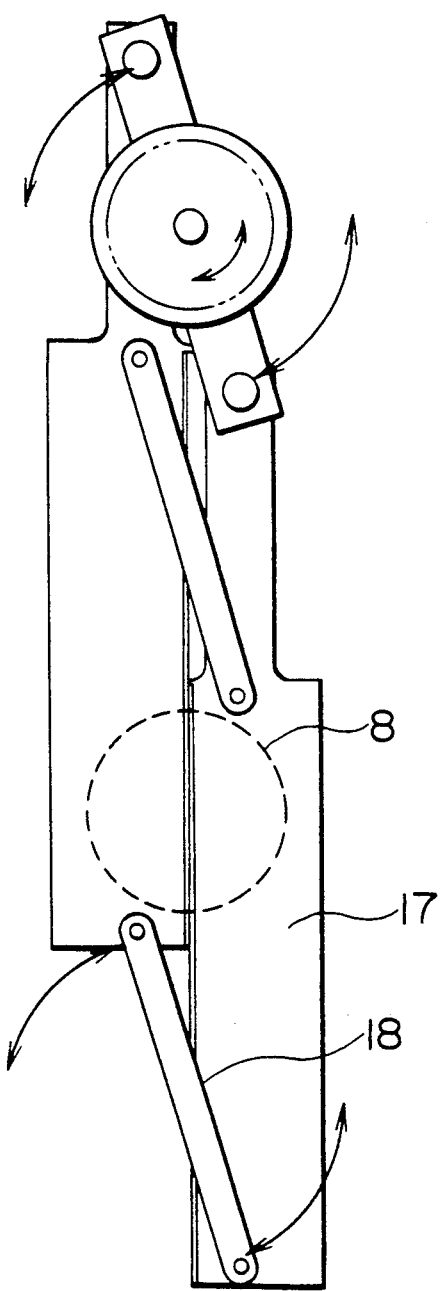
FIG. 3 is a plan view of the divider showing the movements of the pressing plates.
Figure 4:
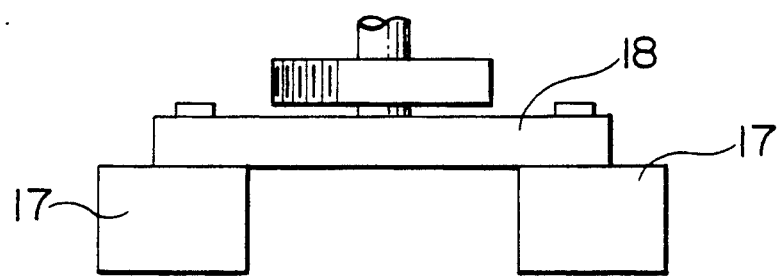
FIG. 4 is a side view of the pressing plates.

Referring to FIGS. 2, 3, and 4, the simultaneous movements of the pressing plates 17 in opposite directions is constrained by the links 18 so that the bar-shaped material 15 is pressed to be divided into a round piece 8.

Figure 6:
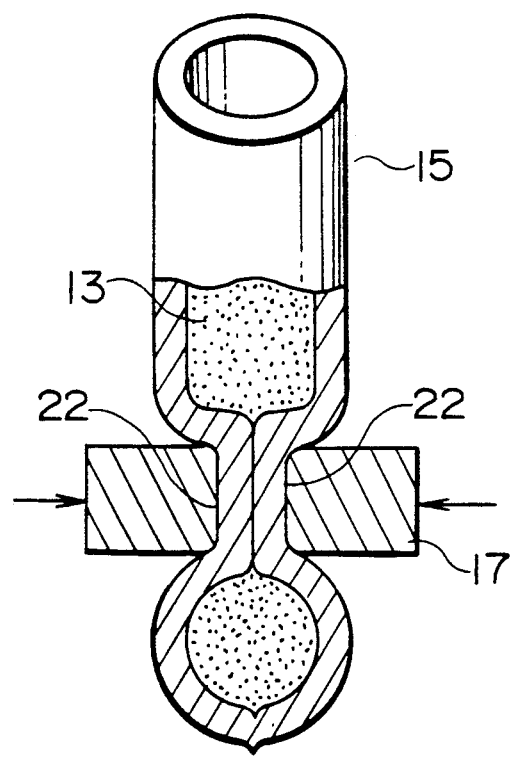
FIGS. 6 and 7 are explanatory schematics showing the operation of dividing a bar-shaped material.
Figure 7:
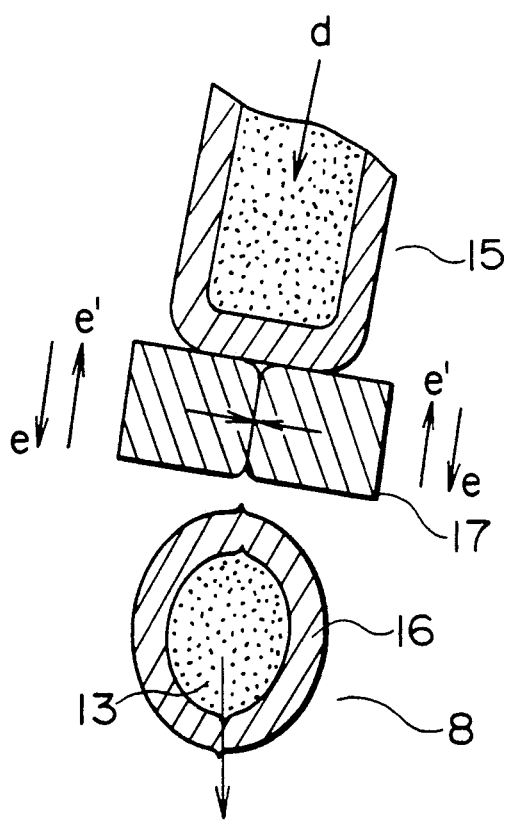

In this dividing process, since the pressing plates 17 thrust through the bar-shaped material 15 while moving in a direction tangential to the periphery of the bar-shaped material 15, a torsional stress is generated at the pressing point so as to securely cover the sections where they are divided with the bread dough 1. This prevents the filling 13 from being exposed. As shown in FIG. 6, the pressing plates 17 exert a pressing force on the periphery of the bar-shaped bread dough 15 toward its center such that due to the resiliency of the outer envelope of the bar 15 the plates urge the envelope to form a neck 22 while separating and moving the filling 13 from the neck into the areas above and below it. As shown in FIG. 7, when the plates abut, the bread dough envelope 16 is also divided into two parts.

When the pressing plates 17, which have flat pressing surfaces unlike the conventional wedge-shaped blades, are used, a neatly rounded product 8, such as a bean jam bun with a round cross section, is obtained, with no filling exposed.

In this case, various kinds of buns of any weight, or containing any weight ratio of filling to dough, can be produced by adjusting the thickness and width of the supplied sheet of bread dough and the quantity of the deposited filling. The stretched sheet of bread dough can be cut by using a conventional cutter (not shown), if necessary, along the traveling direction of the dough sheet, so that a sheet of bread dough having any desired width can be subjected to the succeeding winding process.

The dividing process of this invention, involving the effect of a torsional stress, can also be done by using an assembly consisting of more than two pressing members.

Figure 5:
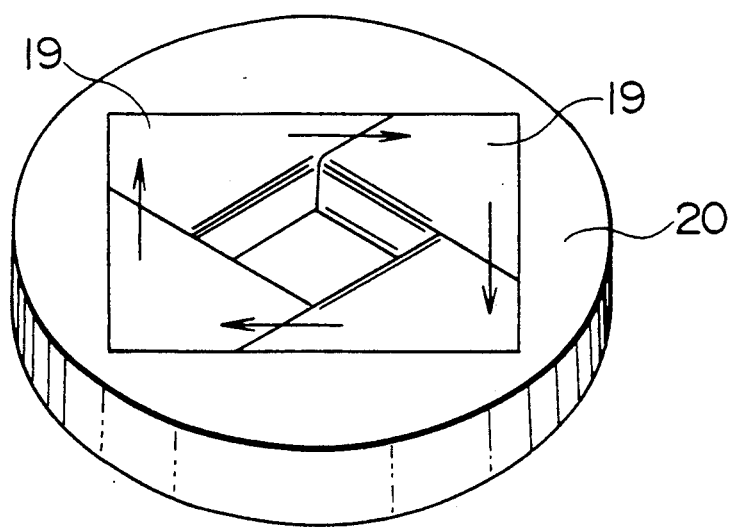
FIG. 5 is a perspective view of another embodiment of the divider.

FIG. 5 shows an example of such a divider. It consists of pressing members 19 slidably disposed in a frame 20 so as to form an opening at the center. The opening and closing movements of the pressing members 19 divide the bar-shaped material passing through the opening.

In FIGS. 6 and 7, the arrow "d" shows the traveling direction of a bar-shaped dough 15 continuously supplied. While the bar-shaped dough 15 is continuously supplied, pressing plates 17 move up and down, as shown by the arrows "e" and "e'," in synchronism with the movement of the bar-shaped dough 15 being supplied. During the time the pressing plates 17 move toward each other, they move down, i.e., in the direction "e." The closing of the pressing plates coincides with the lowest point of the downward movement of the pressing plates 17, thereby dividing the bar-shaped dough 15 to ensure that uniformly divided and smoothly shaped dough products are obtained. During the time the pressing plates 17 move up, i.e., in the direction "e'," they move away from each other so as to allow the bar-shaped dough 15 to pass therebetween. After the pressing plates 17 reach the uppermost position, they start to move down to squeeze the dough bar 15. These movements are repeated.

As shown in FIGS. 6 and 7, the pressing plates 17 can divide and shape a separate piece of product 8, in which a filling 13 is completely surrounded by a bread dough coating 16, without exposing the filling. The winder 5 may not be a sufficient means of securely encrusting a filling with a dough coating to form a filled dough bar. However, the divider 7 of this invention eliminates any loosening of the dough coating to expose the filling due to the torsional force it applies to the product in forming it at its top and bottom areas. Thus, the two simple means cooperate to produce filled buns of a good quality in a very simple manner.

EFFECTS OF THE INVENTION

As described above, this invention can achieve the manufacture of high-quality filled buns by using an apparatus of a simple structure. Also, it has great industrial effects in reducing production labor.

I claim:

1. A method for manufacturing filled dough products, comprising the steps of
    supplying a dough mass on a horizontal conveyor,
    stretching the dough mass into a dough sheet having a uniform width and thickness,
    depositing a filling on the dough sheet,
    rolling the dough sheet in a widthwise direction to form a bar such that the filling is surrounded by the rolled dough sheet,
    causing a leading end of the bar to hang from the conveyor such that the leading end moves in a downward direction in response to movement of the conveyor, and
    dividing the hanging bar by squeezing it with a divider having flat pressing surfaces, such that the bar is divided into separate pieces with no filling exposed.

2. A method of claim 1, wherein the step of dividing the bar includes causing two parallel pressing surfaces to move toward each other along a line perpendicular to the pressing surfaces while moving in opposite directions that are along a line parallel to the pressing surfaces and perpendicular to the downward direction.

3. A method of claim 1, wherein the dividing step includes reciprocating said pressing surfaces in synchronism with the movement of the bar along the downward direction such that the pressing surfaces move away from each other along a line perpendicular to the pressing surfaces when the pressing surfaces are moved in an upward direction and move toward each other along the line when the pressing surfaces are moved in the downward direction.

4. An apparatus for manufacturing filled dough products, comprising:
    a conveyor for transporting a dough mass in a first direction;
    means for stretching the conveyed dough mass into a dough sheet having a uniform thickness;
    means for depositing a filling on the dough sheet,
    means for rolling the dough sheet in a widthwise direction to form a bar such that the filling is surrounded by the rolled dough sheet, and
    means for dividing the bar, said dividing means having a plurality of reciprocating pressing surfaces for squeezing the bar such that the bar is divided into separate pieces with no filling exposed.

5. An apparatus of claim 4, wherein the dividing means includes two parallel pressing surfaces disposed in a horizontal plane.

6. An apparatus of claim 4, further comprising means for reciprocating the pressing surfaces along a vertical direction while the bar is traveling in a downward vertical direction, and causing the pressing surfaces to move away from each other when the pressing surfaces are reciprocated to move up and to move toward each other when the pressing surfaces are reciprocated to move down.

* * * * *